May 12, 1970     W. CALFEE     3,512,013
FREQUENCY SENSING CIRCUIT
Filed Sept. 9, 1966
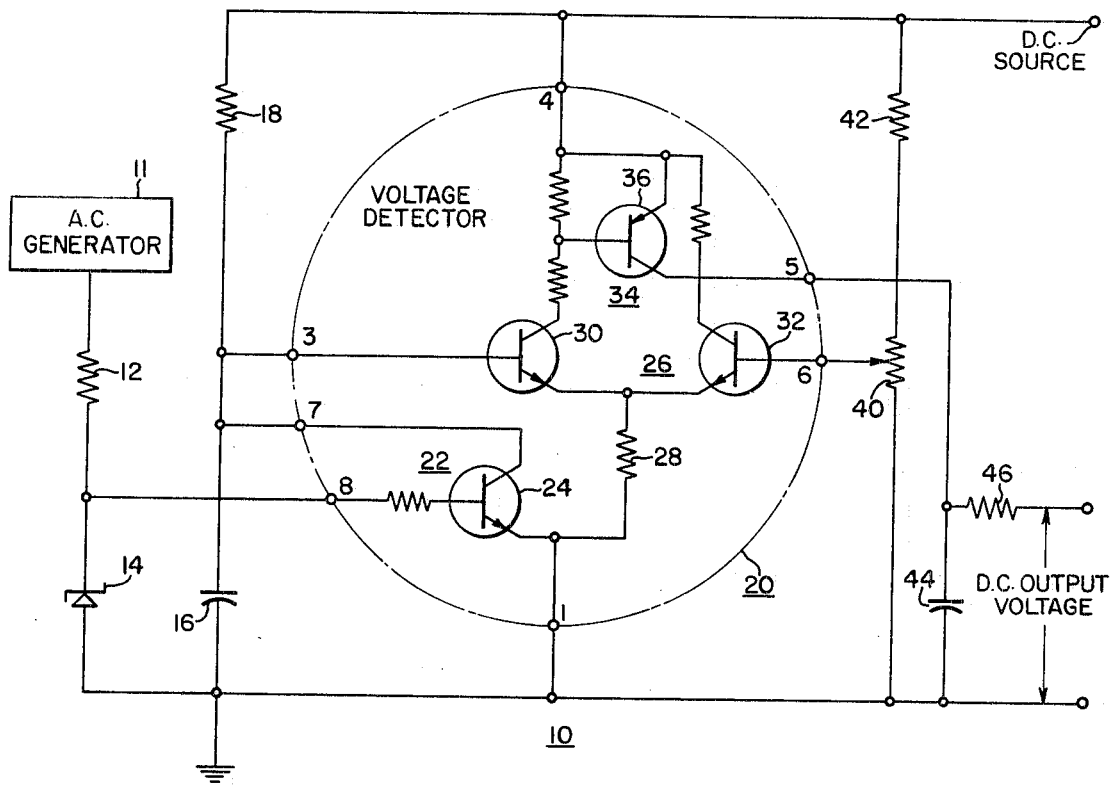
WITNESSES
Theodore F. Wrobel
E. Strickland
INVENTOR
Wendell Calfee
BY F. V. Lyle
ATTORNEY

United States Patent Office 3,512,013
Patented May 12, 1970

3,512,013
FREQUENCY SENSING CIRCUIT
Wendell Calfee, Lima, Ohio, assignor to Westinghouse Electric Corporation, Pittsburgh, Pa., a corporation of Pennsylvania
Filed Sept. 9, 1966, Ser. No. 578,348
Int. Cl. G01r 23/04, 23/10
U.S. Cl. 307—233          5 Claims

ABSTRACT OF THE DISCLOSURE

A frequency sensing circuit including a parallel capacitor-transistor input circuit connected to a differential amplifier voltage detector with an output to an integrator for providing outputs as a function of the frequency under preset conditions of the amplifier.

---

The present invention relates to frequency responsive control devices, and particularly to a frequency responsive circuit capable of using static microminiature components such as molecular and thin film logic elements generally known as integrated circuits.

While the utility of the invention is not restricted to any specific application, it is especially useful in alternating current aircraft electrical systems where size, weight, low power consumption and operating reliability in all types of environment are extremely important.

Air and spacecraft electrical power systems normally function at constant frequency, but the frequency may vary from its nominal value. Therefore, proper protection must be provided against abnormally high and low frequencies since some loads supplied by the system may be damaged or improperly operated thereby, or both.

In U.S. Pat. No. 3,209,212, issued to William W. Billings on Sept. 28, 1965 and assigned to the present assignee, there is shown and described a frequency sensing circuit that performs well, but requires a large amount of the available space and weight due to its use of a saturating transformer and an averaging filter network. Such components do not lend themselves for use in or with miniature control equipment because their size, weight and power dissipation are out of proportion to their function when compared to other circuit functions performed by miniature, solid state elements.

The present disclosure describes a unique frequency sensing circuit arrangement that is highly accurate and yet extremely small and light in weight. This is accomplished by a circuit design limited to the use of low power, small, discrete components and integrated circuits in miniature package form. The circuit compares the time period of a half cycle of one polarity of an input voltage sine wave to a fixed RC time constant (reference potential) developed from a direct current source. The unique circuit disclosed herein preferably comprises a single timing capacitor connected across a voltage detector and an auxiliary amplifier-switching device. The capacitor is further connected to a constant source of direct current voltage to be charged thereby.

The output voltage from an alternating current generator, such as may be employed in an aircraft, is applied to the auxiliary amplifier. The capacitor is charged on one polarity swing of the AC cycle to a voltage level that is inversely proportional to the frequency of the generator voltage. On the other polarity swing of the AC cycle, the auxiliary amplifier switches to clamp the capacitor to ground potential. The voltage detector accurately senses the voltage level to which the capacitor is charged. If the frequency is below a preset value, the voltage on the timing capacitor charges to a detectable level on say each negative half cycle of operation. If the frequency is above a preset value, the voltage on the capacitor does not attain a detectable level. Thus, the voltage detector provides a series of output pulses for frequencies below the preset level and no pulses for frequencies above the preset level. The pulses that are produced are collected by a second capacitor connected across the output of the integrated unit. The second capacitor provides a direct current voltage for frequencies below and no voltage for frequencies above the preset level.

The direct current source supplies both the charging potential and the reference potential so that any voltage variation in the supply will equally affect the two potentials thereby making the circuit insensitive to direct current voltage variations. The circuit is further insensitive to alternating current voltage variations by virtue of a clamping function performed by the auxiliary amplifier receiving the AC input signal in a manner to be more fully explained hereinafter.

It is, therefore, an object of the present invention to provide a unique low cost frequency sensing circuit which operates with a high degree of accuracy and reliability.

Another object of the invention is to provide a novel, low power dissipating frequency sensing circuit including a voltage detector which can be readily miniaturized for packaging in a very small volume.

A further object of the invention is to provide a novel, miniature frequency sensing circuit which operates substantially free of error induced by variations in AC and DC voltage.

Yet another object of the invention is to provide a highly flexible frequency sensing circuit that can detect over and under frequency conditions at a plurality of distinct frequency levels and produce an output signal adaptable for logic functions or relay operation.

These and other objects of the invention will be more apparent upon consideration of the following detailed description along with the accompanying drawing, in which:

The single figure is a schematic diagram of a frequency sensing circuit arranged in accordance with the principles of the present invention.

Specifically, there is shown in the figure an illustrative embodiment of the unique frequency sensing circuit generally designated 10. Circuit 10 is designed to sense the output frequency of generator 11 and produce an output voltage in response thereto. The sensing voltage from the generator is applied to circuit 10 through current limiting resistor 12. The positive swing of the AC cycle is clamped at the breakdown voltage of Zener diode 14 connected between resistor 12 and ground. Thus, the AC voltage during its positive swing is conducted to the base of transistor 24 in auxiliary amplifier-switching circuit 22 which is shown forming a part of an integrated voltage detector circuit 20. With voltage applied to its base, transistor 24 conducts thereby clamping the positive side of capacitor 16, connected to the collector of transistor 24, to ground. This occurs during the positive swing of the AC input voltage. During the negative swing of the cycle, current flows through Zener diode 14 from ground with no signal being applied to the base of transistor 24. Transistor 24 now is non-conductive and immediately unclamps capacitor 16 from ground potential thereby allowing it to charge through series resistor 18 from a suitable direct current source. This process is repeated for each cycle of the AC voltage.

The circuit 10 is made substantially insensitive to variations in the AC voltage by virtue of the Zener diode 14 connected between the base and emitter (ground) of transistor 24. As previously explained, the positive swing of the AC cycle is clamped at the breakdown voltage of the Zener diode. This breakdown voltage is a constant voltage value so that the AC signal supplied to the base of the transistor 24 never exceeds this constant value thereby causing the transistor to conduct only for the voltage value set by the Zener diode. Decreases in the AC voltage would not affect the circuit since the transistor 24 conducts when the AC cycle swings positive. On the negative swing of the AC cycle, the transistor turns off as explained above.

Voltage detector 20 is of the type and operates in the manner substantially as shown and described in copending application Ser. No. 457,445, filed May 20, 1965 now Pat. 3,365,586, issued Jan. 23, 1968, by William W. Billings and assigned to the present assignee. The copending application discloses an integrated unit which provides highly accurate, sensitive, thermally stable voltage level detection (analog-to-digital signal conversion) and the reliability, size and weight saving advantages inherent in molecular circuit devices. In the figure of the present drawing, auxiliary amplifier 22 is included in the molecular detector unit 20 for purposes of further savings of size and weight. Amplifier 22 may, of course, be separate from unit 20, and may use ordinary discrete components.

Electrically, voltage detector 20 might best be described as a differential amplifier with a complementary (NPN–PNP), Darlington-coupled output stage. The differential amplifier 26 is composed of transistors 30 and 32; the complementary, Darlington-coupled circuit 34 consists of transistors 30 and 36 with transistor 30 being of the NPN type and transistor 36 a PNP type.

A direct current reference voltage is applied to terminal 6 of unit 20. The reference voltage is provided by the voltage divider network comprising resistor 42 and variable resistance 40 connected between the direct current supply source and ground. A temperature stable Zener diode (not shown) may be used in place of variable resistance 40 for providing the reference voltage, though detector unit 20 as shown is inherently temperature stable thereby ensuring stable operation of frequency sensing circuit 10. Circuit 10 is further insensitive to variations in the DC supply. The same DC source supplies both the reference potential and the charging potential for capacitor 16 so that any change in the DC source will be equally reflected in the sensing and reference voltage portions of circuit 10.

With DC voltage applied to terminal 4, and terminal 1 conected to ground, voltage detector 20 senses the level of voltage charge (sensing voltage) on capacitor 16 for each negative half cycle of the sensing voltage, and produces an output pulse at terminal 5 when the sensing voltage applied to terminal 3 and the base of transistor 30 is equal to or greater than the reference voltage level on terminal 6 of the detector. That is, the level to which the voltage on capacitor 16 rises each cycle is inversely proportional to the frequency of generator 11 output voltage so that if the frequency is below an adjusted value, determined by the setting of resistor 40, the voltage on the capacitor charges to a detectable level each cycle. If the frequency is above that value, the voltage on capacitor 16 does not reach a detectable level and no output pulse is produced. The manner in which detector 20 accomplishes this is explained below.

When the level of sensing voltage apearing at terminal 3 is below the reference voltage level at terminal 6 and the base of transistor 32, the transistor 32 will conduct and produce a voltage across common emitter resistor 28 that reverse biases the base-emitter junction of transistor 30. Thus transistor 30 is now non-conducting and produces no signal for application to the base of transistor 36 thereby causing transistor 36 to be in a non-conductive state. With transistor 36 non-conductive, no output pulse appears at terminal 5 of detector 20. When the sensing voltage at terminal 3 is equal to or greater than the level of reference voltage at terminal 6, the reverse bias on transistor 30 is overcome and the transistor conducts, thereby reverse biasing transistor 32 through common emitter resistor 28. With transistor 30 conducting, a base signal is supplied to transistor 36 thereby causing its conduction and the appearance of a discrete output signal at terminal 5. A plurality of discrete (pulse) signals are collected and integrated by capacitor 44, and with resistor 46, provides a direct current output voltage for generator frequencies below the value set by variable resistance 40. No voltage is produced for frequencies above the set value. The output voltage can be used to operate a relay or work compatibly with logic functions for purposes of ensuring proper operation and protection of load devices using the system voltage provided by generator 11. Both under and over frequency protection may be provided by circuit 10 depending upon how the output voltage is used.

The circuit 10 may, if desired, be connected to produce an output signal when the reference voltage exceeds that of the sensing voltage on capacitor 16. This may be accomplished by simply reversing the connections at terminals 3 and 6 so that reference voltage is applied at terminal 3 and the sensing voltage is applied at terminal 6.

It should now be apparent from the above description that a unique frequency sensing circuit has been disclosed that is particularly adaptable for use in air and space vehicles because of its operating reliability, its small size, weight and power dissipation, and its thermal and voltage stability. These results are accomplished by applicant's novel combination of a timing capacitor and an integrated voltage detector unit that accurately senses the level of charge on the capacitor representing the frequency of the applied voltage. The circuit is not, however, limited to use in aircraft systems and frequencies, but is obviously adaptable for other environments and system frequencies.

Though the invention has been described with a certain degree of particularity, it is to be understood that the disclosure has been made by way of example only and that changes may be made therein without departing from the scope and spirit of the invention.

What is claimed is:

1. A circuit for sensing the frequency of an alternating current voltage comprising means producing a continually alternating voltage waveform, a capacitor, means for charging the capacitor at a constant rate only during full half cycles of one polarity of said alternating waveform, a transistor having its collector and emitter connected across the capacitor, diode means for applying base current to the base of the transistor only during half cycles of the opposite polarity of said alternating waveform, voltage comparing means for comparing the capacitor voltage to a reference voltage, and means for producing an output signal only when a predetermined one of the latter two voltages exceeds the other.

2. The circuit of claim 1 wherein the charging means includes a common source of direct current providing both the charging voltage and the reference voltage.

3. The circuit of claim 1 including said diode means is connected across the base and emitter of the transistor, said diode means being effective to conduct during half cycles of said one polarity of the alternating current voltage.

4. The circuit of claim 1 wherein the transistor is effective to clamp the capacitor to ground potential when the base current is applied thereto.

5. The circuit of claim 1 including means for integrating and filtering the output signal to produce a direct current voltage representative thereof.

References Cited

UNITED STATES PATENTS

| | | | |
|---|---|---|---|
| 2,122,464 | 7/1938 | Golay | 324—78 |
| 2,405,843 | 8/1946 | Moe | 328—111 |
| 2,489,824 | 11/1949 | Shenk | 328—30 |
| 2,789,217 | 4/1957 | Lacy | 328—30 |
| 2,867,767 | 1/1959 | McGillem et al. | 324—78 |
| 2,924,712 | 2/1960 | Edens | 328—186 |
| 3,093,756 | 6/1963 | Rywak | 328—111 |
| 3,277,311 | 10/1966 | Merlen et al. | 328—111 |

STANLEY D. MILLER, Primary Examiner

H. A. DIXON, Assistant Examiner

U.S. Cl. X.R.

307—295; 328—140